United States Patent [19]
Finkbeiner et al.

[11] Patent Number: 4,703,985
[45] Date of Patent: Nov. 3, 1987

[54] RACEWAY FOR CURVED WALL PANEL
[75] Inventors: James Finkbeiner, Kentwood; Lee Brookhouse, Holland, both of Mich.
[73] Assignee: Haworth, Inc., Holland, Mich.
[21] Appl. No.: 699,111
[22] Filed: Feb. 7, 1985
[51] Int. Cl.$^4$ ............................................. H02G 3/22
[52] U.S. Cl. ..................................... 439/207; 174/48
[58] Field of Search ..................... 339/20, 21 R, 22 R, 339/22 B, 23, 24; 174/48, 49, 101

[56] References Cited
U.S. PATENT DOCUMENTS 4,277,123  7/1981  Haworth et al. ................. 339/22 R
4,308,418  12/1981  Van Kuik et al. ..................... 174/48
4,377,724  3/1983  Wilson ............................... 339/22 R Primary Examiner—Gil Weidenfeld
Assistant Examiner—Thomas M. Kline
Attorney, Agent, or Firm—Flynn, Thiel, Boutell & Tanis

[57] ABSTRACT

A raceway for a curved wall panel, which raceway is formed by two substantially identical raceway cover members which are of substantially L-shaped cross section and include a substantially vertical leg which defines a side cover and a lower substantially horizontal leg. The vertical leg has a tang which projects inwardly adjacent the upper edge thereof for wedging engagement with the wall panel. The cover member is initially constructed as a straight elongated member having sufficient flexibility to enable it to be bent inwardly or outwardly to conform to the curvature of the wall panel. The lower leg, in the longitudinal direction is formed by a plurality of toothlike projections spaced by intermediate recesses so that the lower leg can be readily bent to conform to the curvature of the panel. Each toothlike projection terminates in a hook so that, when the opposed inner and outer covers members are secured to the panel, the hooks cam past one another and then hookingly engage to secure the inner and outer cover members together.

11 Claims, 8 Drawing Figures

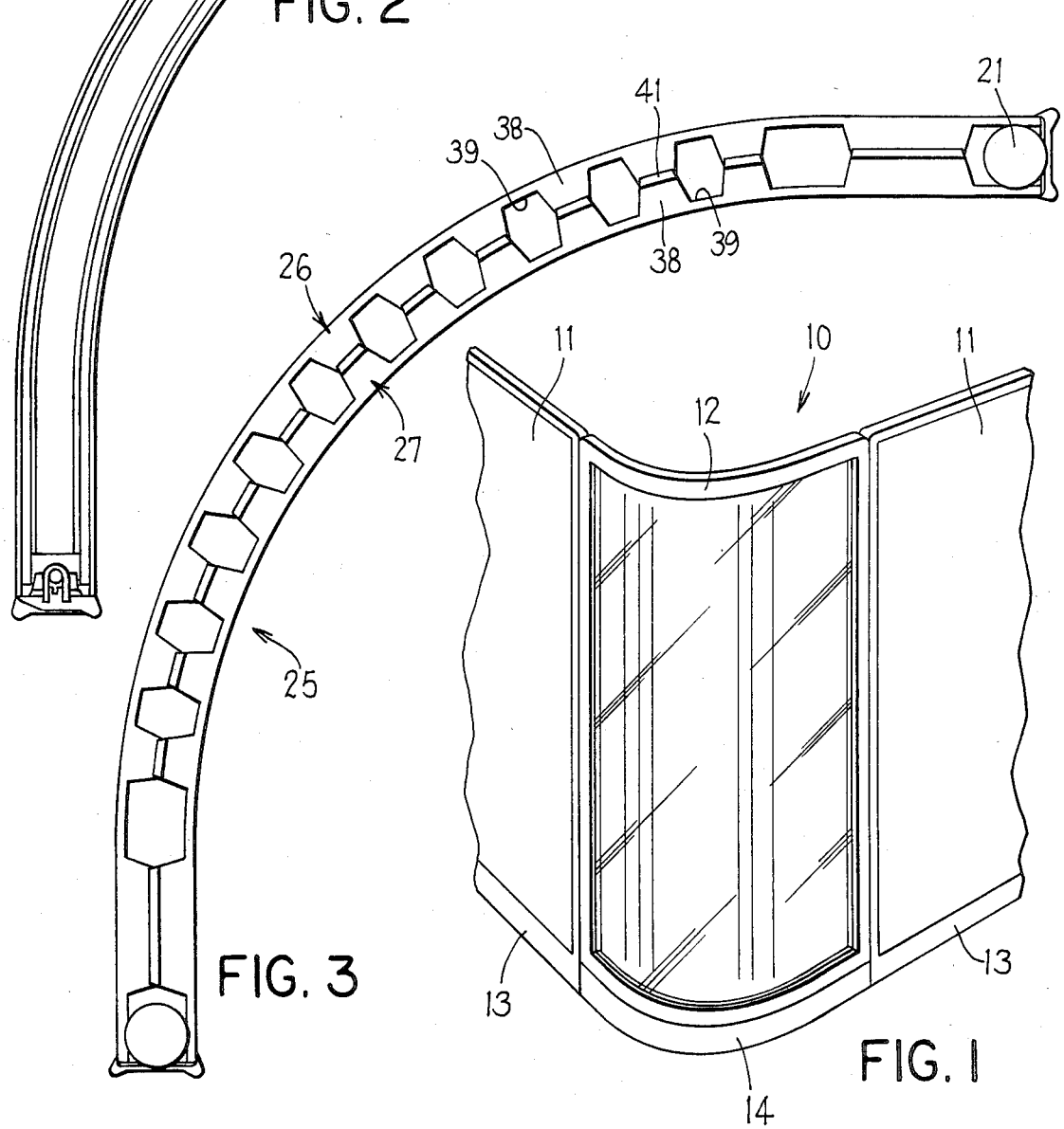

RACEWAY FOR CURVED WALL PANEL

FIELD OF THE INVENTION

This invention relates to an improved raceway for a curved wall panel.

BACKGROUND OF THE INVENTION

Interior wall panel systems of the type used for dividing offices and other interior regions into smaller work areas are well known. These systems include a plurality of prefabricated upright panels releasably joined together and, in many such systems, the panels are individually electrically prewired, with electrical terminals on adjacent panels being joined by flexible electrical connectors which plug into the adjacent terminals, whereby the supplying of electrical energy to areas bounded by the panel system is greatly facilitated. The panels have a raceway structure extending longitudinally therealong, generally along the lower edge of the panels, which structure encloses the electrical system and facilitates the extension of communication cables along the wall system in an efficient yet hidden manner, while permitting desired utilization of these cables at desired locations. To hide yet provide access to the power system and communication cables, the raceway structure typically includes a raceway of a generally channel-shaped configuration which removably attaches to the lower edge of the panel, which raceway normally involves either openable or removable side covers. Numerous variations of such raceways are known in the art.

While several satisfactory raceways are known and utilized particularly in association with straight panels, nevertheless the raceway structure is further complicated by the fact that wall systems of this type often utilize curved corner panels. These curved corner panels typically define a 90° angle to hence provide a rounded corner which improves the aesthetics of the wall system and the accessibility and usability of hallways and walkways therearound. These curved corner panels, however, must still be provided with a raceway structure therealong which can accommodate the power and communication cables which are associated with the straight panels connected to opposite ends of the curved corner panel. The raceway for such curved corner panel has, however, presented a long-standing problem in this industry.

At present, some manufacturers form the raceway for the curved corner panel of a rigid structure, such as by providing rigid curved side covers, one being an inner cover and the other an outer cover. This arrangement, however, possesses several disadvantages. For example, shipment of these covers is difficult since the curvature and rigidity of the covers requires significantly greater shipping space. The rigidity of these covers also increases the difficulties associated with installing the covers on the curved panel since the tolerances associated with the panel and cover can often make fitting of the covers a difficult endeavor.

To avoid use of rigid side covers of the type described above, others have attempted to utilize flexible side covers for use on the curved panels. These flexible raceway covers possess obvious advantages since these flexible covers can be manufactured and shipped in a straight condition, with the covers then being suitably bent either inwardly or outwardly so as to conform to the curvature of the panel. While this advantage has been recognized, nevertheless the known curved covers have also possessed disadvantages which have been tolerated in the absence of a more desirable solution. For example, the known flexible covers for use on curved panels have generally required that the cover be either wedged or snapped into position on the panel so as to form a closed lower raceway. While the covers appear to fit properly at least initially, nevertheless it has been observed that after the covers have been installed for a period of time, they tend to loosen relative to the panel, particularly since the covers are subject to kicking and the like from people passing by the panels, so that the ends of the cover (particularly the outer curved cover) tend to loosen and oftentimes spring away from the panel. Needless to say, this is highly undesired. In addition, since the flexible side covers have been formed substantially as flat strips which are then curved to conform to the panel, it has generally been felt that the strips must be substantially flat and hence they have been typically provided solely with small locking tangs or wedges projecting therefrom for engagement with the frame on the panel. Hence, typically some other type of tie or bottom member has been required in an attempt to prevent sideward separation between the inner and outer covers. In fact, one manufacturer has gone so far as to utilize a plurality of small extension springs disposed at spaced intervals longitudinally along the covers, which extension springs are positioned between the covers and extend sidewardly therebetween so as to resiliently pull the covers inwardly toward one another. Needless to say, this requires a very difficult and time consuming installation procedure.

Accordingly, it is an object of this invention to provide an improved raceway for a curved wall panel, which raceway overcomes many of the above-mentioned disadvantages.

In the raceway of the present invention, the raceway is formed by two raceway cover members which are substantially identical except for length, and which are of substantially L-shaped cross section and include a substantially vertical leg which defines a side cover and a lower substantially horizontal leg which hooks to the lower leg of the other cover member for securing the two cover members together. The vertical or cover leg has a tang which projects inwardly adjacent the upper edge thereof for clamping or wedging engagement with the wall panel. The cover member is longitudinally elongated corresponding approximately to the length of the panel, and is initially constructed as a straight elongated member, with the elongated member having sufficient flexibility so as to enable it to be bent inwardly or outwardly so as to conform to the inner or outer curvature of a conventional curved wall panel. The lower leg, in the longitudinal direction of the member, is formed by a plurality of projecting toothlike portions spaced by intermediate recesses so that the lower leg can be readily bent or flexed to enable the member to accommodate the inner or outer curvature of the panel. Each of the toothlike projections terminates, at the free end thereof, in a double-hook arrangement so that, when the opposed inner and outer cover members are secured to the curved panel, the hooks on the lower legs will automatically cam past one another and then hookingly engage with respect to one another to secure the inner and outer cover members together.

Other objects and purposes of the invention will be apparent to persons familiar with structures of this general type upon reading the following specification and inspecting the accompanying drawings.

BRIEF DESCRIPTION OF THE DRAWINGS

FIG. 1 is a fragmentary, perspective view illustrating a wall panel system incorporating a conventional curved corner panel therein.

FIG. 2 is a plan view illustrating the raceway assembly as disconnected from the panel.

FIG. 3 is a bottom view of the raceway assembly shown in FIG. 2.

Figure 4:
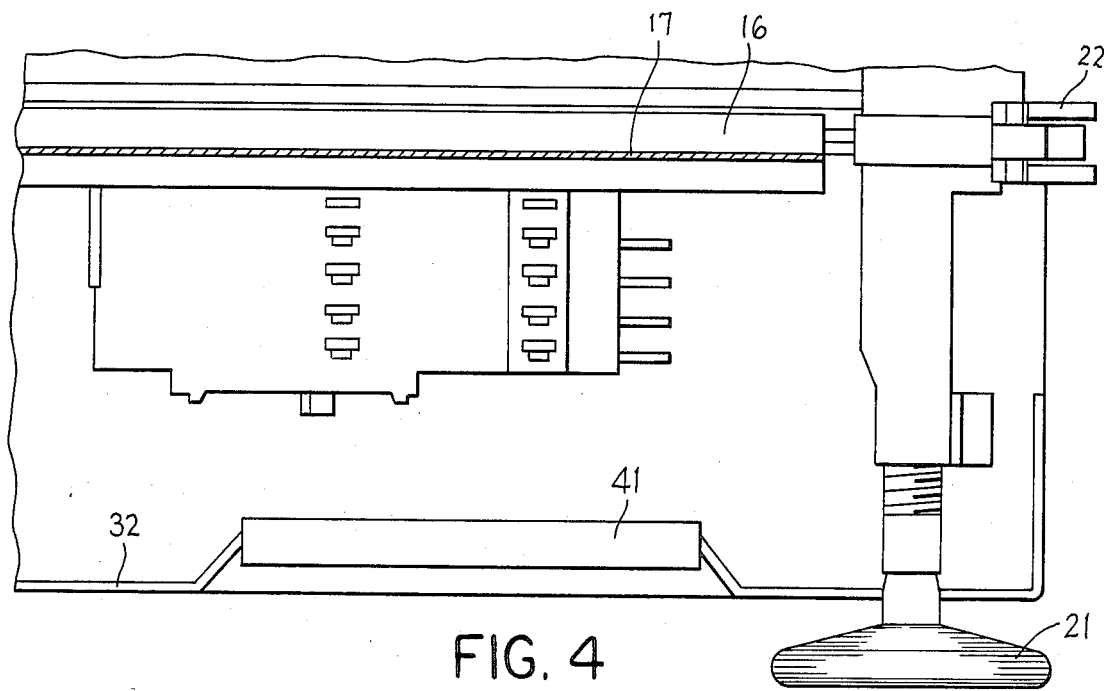
FIG. 4 is an enlarged fragmentary sectional view taken substantially along line IV—IV in FIG. 2.

Certain terminology will be used in the following description for convenience in reference only, and will not be limiting. For example, the words "upwardly", "downwardly", "rightwardly" and "leftwardly" will refer to directions in the drawings to which reference is made. The words "inward" and "outward" will refer to directions toward and away from, respectively, the geometric center of the assembly and designated parts thereof. Said terminology will include the words specifically mentioned, derivatives thereof, and words of similar import.

DETAILED DESCRIPTION

FIG. 1 illustrates therein a fragmentary view of a wall system 10 formed from a plurality of prefabricated upright wall panels, specifically a pair of straight panels 11 joined together by a curved corner panel 12, the latter defining an angle of about 90°. The straight panels 11 have a raceway structure 13 extending along the lower edge thereof, which raceway structure includes electrical wiring associated therewith for permitting electrical energy to be distributed along the wall system, this raceway structure corresponding substantially to that illustrated by U.S. Pat. No. 4,277,123. This raceway structure, in addition to providing electrical communication between and along the panels, also defines therein an interior raceway chamber in which communication cables are also disposed so as to extend longitudinally along the panel system.

The raceway structure 14 associated with the curved panel is provided so as to not only provide a compatible appearance with the other panels, but to also permit both electrical and communication cables to extend therealong for providing appropriate communication to and between the adjacent straight panels 11.

Figure 5:
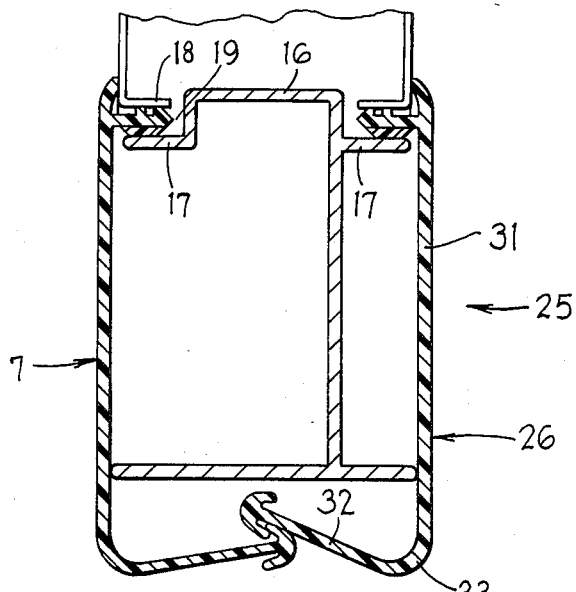
FIG. 5 is an enlarged fragmentary sectional view taken substantially along the line V—V in FIG. 2.

This raceway assembly 14, as illustrated by FIG. 5, includes a wire channel 16 which extends longitudinally along the panel adjacent the lower edge thereof, which wire channel 16 accommodates therein the electrical wiring which terminates in appropriate electrical terminals adjacent the opposite lower corners of the panel. This wire channel 16 has ribs or flanges 17 projecting horizontally outwardly from opposite sides thereof, which ribs also extend longitudinally throughout the length of the panel. These latter ribs or flanges 17 are spaced downwardly a small distance from the lower rails or flanges 18 associated with the frame of the panel so as to define narrow slotlike spaces 19 which extend longitudinally of the panel and open horizontally toward the opposite sides thereof. Adjacent the opposite ends of the raceway structure are a pair of adjustable glides or feet 21, the latter having threaded shafts which engage the panel frame for supporting the panel on a support surface such as a floor. These glides 21 also mount thereon alignment members 22 which project endwise and cooperate with the alignment member of an adjacent panel so as to permit serially connected panels to be appropriately vertically aligned.

The structure of the raceway assembly, as described above, is conventional and well known so that further description thereof is believed unnecessary.

Considering now the raceway structure 14 for the curved panel, this structure 14 includes a channel-like raceway 25 which is removably secured to the lower edge of the wall panel 12 and projects downwardly therefrom to a position closely adjacent the floor or support surface. This raceway 25 has a width which substantially corresponds to that of the wall panel, and it defines therein a substantially closed channel-like space for accommodating the electrical components and any communication cables which extend along the wall system.

The raceway 25 for the curved panel 12 is formed by a pair of raceway covers 26 and 27, which covers are substantially identical except that outer cover 26 is slightly longer than inner cover 27, so that only the cover 26 will be described in detail, it being understood that the cover 27 is substantially identical thereto.

Cover 26, as illustrated by FIGS. 4-8, is of a substantially L-shaped cross section and includes a substantially vertical side leg 31 and a bottom leg 32, which legs 31 and 32 have their inner ends appropriately joined by a rounded corner 33. Each of these legs 31 and 32 is elongated in a direction perpendicular to their L-shaped cross section inasmuch as the cover 26 has a length which closely corresponds to the length of the panel, which length is normally in the range of about 30 to about 48 inches.

The side leg 31 has a locking tab or flange 35 projecting inwardly therefrom in perpendicular relationship thereto, this tab or flange 35 being disposed closely adjacent the upper free edge of the side leg 31. Flange 35 projects inwardly from leg 31 in the same direction as the bottom leg 32 but is spaced upwardly a substantial distance therefrom. This flange 35 extends longitudinally throughout the complete length of the side leg 31 and has a pair of spaced ribs 36 projecting upwardly from the upper surfaces thereof, which ribs also extend longitudinally throughout the complete length of the flange. A pad 37 is fixedly secured to the underside of the flange 35, which pad also extends longitudinally along the flange in substantially parallel relationship to the aforementioned ribs 36. Pad 37 is constructed of a plastic material having a durometer which is somewhat less than that of the remainder of the cover so that the pad hence has increased elastic deformability to assist in securely resiliently holding the tab 35 within the slotlike space 19 when the cover is mounted on the curved wall panel.

Considering now the lower or bottom leg 32 of the cover, this lower leg has a configuration which resembles a gear rack configuration in that it is formed by a plurality of toothlike projections 38 which project outwardly in cantilevered relationship from the rounded corner 33. These toothlike projections 38 are spaced apart longitudinally of the cover member by intermediate recesses 39 which have a width and configuration similar to that of the toothlike projections. These recesses project inwardly of the leg from the free end thereof to a point which substantially corresponds to the tangential point between the lower leg and the rounded corner.

The toothlike projections 38 which define the lower leg 32 project inwardly from the side leg 31 through a distance which approximately equals one-half the width of the wall panel. Each of the toothlike projections 38, at the outer free end thereof, is provided with a hook 41 thereon which is of substantial longitudinal extent. This hook 41 includes upper and lower hook parts 42 and 43, respectively, which are disposed on opposite sides of the toothlike projection and project inwardly from the free edge thereof. These hook parts 42 and 43 hence define upper and lower hook-receiving recesses 44 and 45, respectively, which recesses extend in the longitudinal direction of the cover member throughout the extent of the toothlike projection at the free end thereof. The lower hook part 43 preferably extends outwardly toward the respective sidewall through a slightly greater extent than the upper hook part 42, as illustrated by FIG. 8.

Figure 8:
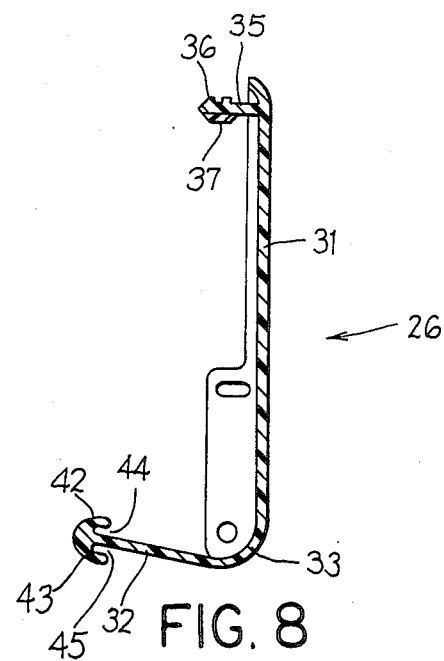
FIG. 8 is a cross-sectional view taken substantially along line VIII—VIII in FIG. 7.
Figure 6:
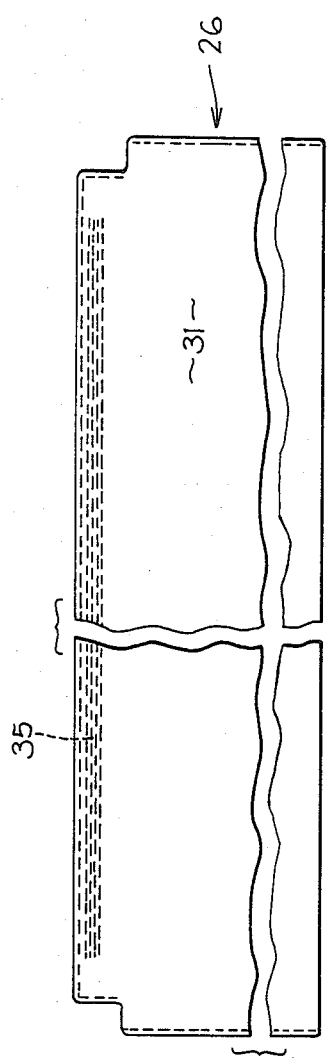
FIG. 6 is a side elevational view of the raceway cover.
Figure 7:
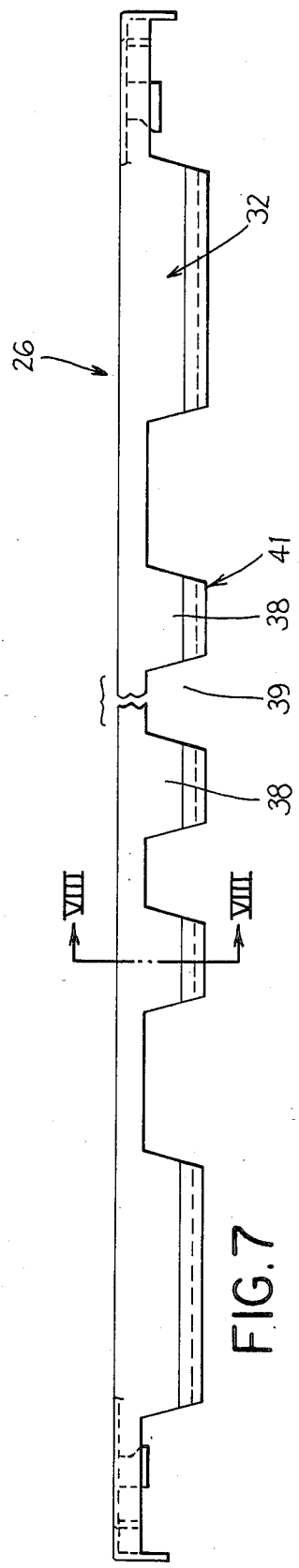
FIG. 7 is a bottom view of the cover shown in FIG. 6.

As indicated by FIG. 8, the bottom leg 32 preferably is formed so as to slope upwardly at a slight angle with respect to the horizontal, such as an angle of about 15°. This hence results in the angular relationship between the bottom leg 32 and the side leg 31 normally being less than 90°.

The cover 26 (and its substantially identical counterpart 27) is preferably formed of a rather stiff plastic material, such as PVC, and can preferably be formed by an extrusion process since this greatly simplifies the forming of the elongated covers with the desired L-shaped cross section. After the extrusion operation has been completed, then the bottom leg 32 of the cover is subjected to a stamping operation so as to effect formation of the recesses 39 therein. During the extrusion of the cover, the pad 37 is extruded simultaneous with the locking tab 35, but of a PVC having a lower durometer, so that the pad hence has greater elasticity but is nevertheless an integral part of the overall cover, which cover hence is an integral one-piece structure. This resulting one-piece cover structure is substantially straight but, due to the recesses 39 associated with the bottom leg, the cover can be resiliently flexed or deformed substantially within a horizontal plane which is perpendicular to the side leg 31 so that the cover and specifically the side leg 31 will hence assume either the inside or outside curvature required for the raceway of the curved panel 12.

To assemble the cover to the curved panel, the cover 26 is flexed to assume a curved configuration which approximately corresponds to that of the panel. The locking tab 35 is pressed into the appropriate slotlike space 19. By inserting the locking tab into this space throughout the length of the panel, this hence results in a secure attachment of the upper edge of the cover to the panel, which securement is enhanced by the wedging of the tab within the space due to the ribs 36 and the elastic deformation of the pad 37.

After the inner and outer covers have been secured to opposite sides of the curved panel as described above, this hence results in the lower legs of the opposed inner and outer covers being positioned in close proximity to one another. The opposed inner and outer covers are then pressed inwardly toward one another, which due to the rounded camlike shape formed on the outer surfaces of the hooks 41, causes the hooks on one of the covers to cam upwardly over the hooks on the other cover, following which the resiliency of the lower legs causes the lower legs on the opposed covers to move toward one another so that the lower hook part on one cover is hence aligned with the slot defined by the upper hook part on the other cover. By manually releasing the compression imposed on the covers, the covers then resiliently deflect outwardly away from one another and hence cause the hooks 41 of the opposed covers to hookingly engage one another substantially as illustrated in FIG. 8. This hence prevents any subsequent separation between the inner and outer covers, and hence prevents either of the covers, and particularly the outer cover, from tending to disengage itself from the panel due to the natural tendency of the cover to return to a straight configuration.

The hooked engagement between the lower legs of the opposed covers hence not only positively maintains the inner and outer covers on the curved panel, but it also effectively defines a bottom wall so as to support any communication cables which extend through the raceway so as to prevent such cables from drooping downwardly into engagement with the support surface or floor.

Hence, the improved curved raceway cover is desirable since it still permits the raceway to be formed from two substantially identical elongate covers which can be formed as straight members and then suitably deformed to the desired curvature, with the two covers being readily connected to opposite sides of the panel and then hooked together along their lower edges to form a secure channel-shaped raceway. The resulting raceway can hence be manufactured in an efficient manner, handled and shipped economically due to its straight configuration, and handled and installed rapidly and efficiently without requiring complex tools. At the same time, the installed raceway possesses the desired appearance and durability, and resists loosening even after it has been installed for long periods of time. The raceway also possesses substantial durability so as to withstand the impacts imposed thereon, such as by kicking.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In combination, an upright space-dividing wall panel which in horizontally curved, and a raceway structure removably attached to the lower edge of said curved panel and extending longitudinally therealong, the raceway structure including first and second removable covers which are positioned approximately coextensive with the opposite sides of the curved panel and project down from the lower edge thereof, each of the covers being of a flexible plastic material so as to be bent into the curved configuration of the panel, comprising the improvement wherein each of said first and second covers has a generally L-shaped cross section and includes a vertical side leg and a bottom leg which projects inwardly from the side leg adjacent the lower end thereof, each bottom leg being of a saw tooth configuration in the longitudinal direction of the cover as defined by a plurality of cantilevered projections spaced apart by intermediate recesses so as to permit bending of the cover to conform to the curvature of the panel, and hook means on said opposed covers at longitudinal intervals therealong for holding the opposed covers in conformance with the curvature of the panel, said hook means being formed integrally on said cantilevered projections adjacent the free ends thereof, the cantilevered projections on the opposed covers projecting inwardly toward one another so that the hook means on one cover engage the hook means on the other cover, said hook means including upwardly and outwardly oriented hooks provided on cantilevered projections of one said cover and downwardly and outwardly oriented hooks on cantilevered projections of the other cover, the upwardly and downwardly oriented hooks being engaged with one another when the covers are mounted on the curved panel to prevent outward separation between the opposed covers.

2. In combination, an upright space-dividing walal panel which is horizontally curved, and a raceway structure removably attached to the lower edge of said curved panel and extending longitudinally therealong, the raceway structure including first and second removable covers which are positioned approximately coextensive with the opposite sides of the curved panel and project down from the lower edge thereof, each of the covers being flexible so as to be bent into the curved configuration of the panel, comprising the improvement wherein each of said first and second covers has a generally L-shaped cross section and includes a vertical side leg and a bottom leg which projects inwardly from the side leg adjacent the lower end thereof, each bottom leg being of a saw tooth configuration in the longitudinal direction of the cover as defined by a plurality of cantilevered projections spaced apart by intermediate recesses, and hook means formed integrally on said cantilevered projections adjacent the free ends thereof, the cantilevered projections on the opposed covers projecting inwardly toward one another so that the hook means on one cover engage the hook means on the other cover to present outward separation between the opposed covers, the hook means associated with the free end of each cantilevered projection including both upper and lower hook parts which open sidewardly toward the respective side leg so that the upper hook part associated with one cover engages the lower hook part of the other cover to prevent outward separation between said covers.

3. A combination according to claim 2, wherein the bottom legs are sloped upwardly at a small angle relative to the horizontal as the bottom leg projects inwardly from its intersection with the side leg, and the hook parts having rounded outer configurations which act as cams so that the hook parts on one bottom leg will deflect and move over the hook part of the opposed bottom leg when the covers are assembled on the panel.

4. A combination according to claim 3, wherein each said cover is a one-piece structure constructed of a plastic material having at least limited elasticity.

5. A combination according to claim 1, wherein the cover has a locking tab integrally formed thereon and projecting substantially perpendicularly inwardly from the side leg adjacent the upper end thereof, said tab having a compression pad secured to one side thereof and extending lengthwise of the cover, said pad being of a softer plastic material to create a compressive fit of the locking tab within a sidewardly directed slotlike opening formed in the curved panel adjacent the lower edge thereof.

6. A raceway for a horizontally curved, upright space divider panel, comprising:
first and second horizontally elongated raceway cover members each of a substantially L-shaped cross section;
each said cover member including a substantially vertically oriented side leg which is of, said side leg adjacent the upper free edge thereof having a locking tab which is fixed thereto and projects substantially perpendicularly from an inner surface thereof, said locking tab extending horizontally of said side leg throughout substantially the full horizontal extent thereof;
each said cover member including a bottom leg which projects inwardly in transverse relationship from the vertical plane of said side leg, said bottom leg having one end thereof integrally joined to the lower end of said side leg through a rounded corner, said bottom leg having an outer end which is free, said bottom leg extending throughout substantially the horizontal longitudinal extent of the cover member;
each said bottom leg being formed by a plurality of cantilevered projections which project inwardly in transverse relationship from said side leg, said cantilevered projections being spaced apart by intermediate recesses along the horizontal longitudinal extent of the cover member;
hook means fixedly associated with the cantilevered projections of said first and second cover members for coupling said cover members together to prevent outward separation therebetween when the cover members are mounted on the curved panel;
said hook means including upwardly and outwardly oriented hooks provided on the cantilevered projections of said first cover member adjacent free ends thereof, said hook means also including downwardly and outwardly oriented hooks on the cantilevered projections of the second cover member adjacent free ends thereof, whereby the upwardly and downwardly oriented hooks engage one another when the cover members are mounted on the curved panel to prevent outward separation of the cover members.

7. A raceway according to claim 6, wherein the inner free edge of the cantilevered projections associated with each of said first and second cover members are provided with both upper and lower hooks which are directed outwardly so that the upper hook on one cover member will automatically engage with the lower hook on the other cover member to secure the two cover members together.

8. A raceway according to claim 7, wherein the bottom leg is sloped upwardly on an angle of about 15° as it projects horizontally away from the curved corner, the bottom leg being resiliently deflectable, and the hooks having rounded camlike outer surfaces so that the hooks when moved toward one another will slidably move past one another to effect automatic engagement therebetween.

9. A raceway according to claim 8, wherein each said cover member is constructed in one piece of a plastic material and is initially straight in the longitudinal direction, said cover member being flexible and deformable to assume a horizontally curved configuration generated about a vertical axis spaced from the plane of the side leg.

10. A raceway according to claim 6, wherein the bottom leg members of the first and second cover members project inwardly toward one another, and wherein the hooks have rounded camlike outer surfaces so that the hooks when moved toward one another slidably move past one another to effect automatic engagement therebetween to prevent outward separation of the cover member.

11. A combination according to claim 1, wherein the lower legs project inwardly toward one another in intersecting relationship so that the hooks associated with the opposed covers can initially slidably cam one over the other and then create a positive hooked engagement therebetween for preventing outward separation between the opposed covers.

* * * * *

UNITED STATES PATENT AND TRADEMARK OFFICE
CERTIFICATE OF CORRECTION

PATENT NO. : 4 703 985

DATED : November 3, 1987

INVENTOR(S) : James Finkbeiner et al

It is certified that error appears in the above-identified patent and that said Letters Patent is hereby corrected as shown below:

Column 7, line 24; replace "walal" with ---wall---.

Column 7, line 46; replace "present" with ---prevent---.

Column 8, line 13; after "of" insert ---a thin sheetlike construction---.

Signed and Sealed this

Ninth Day of August, 1988

*Attest:*

DONALD J. QUIGG

*Attesting Officer*　　　　　*Commissioner of Patents and Trademarks*